UNITED STATES PATENT OFFICE.

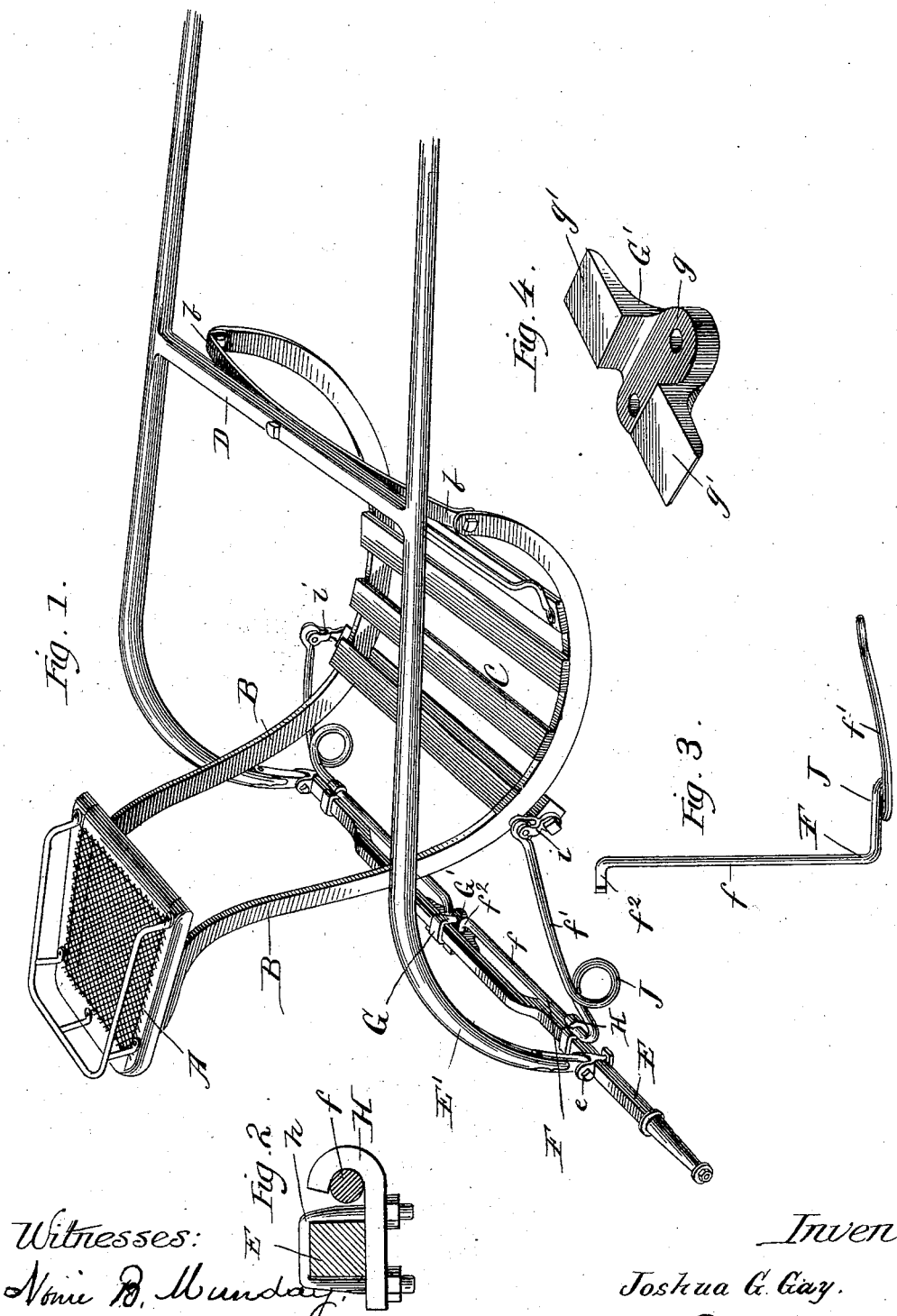

JOSHUA G. GAY, OF OTTAWA, ILLINOIS.

ROAD-CART.

SPECIFICATION forming part of Letters Patent No. 387,637, dated August 14, 1888.

Application filed May 28, 1888. Serial No. 275,293. (No model.)

*To all whom it may concern:*

Be it known that I, JOSHUA G. GAY, a citizen of the United States, residing in Ottawa, in the county of La Salle and State of Illinois, have invented a new and useful Improvement in Road-Carts, of which the following is a specification.

This invention relates to the construction of the springs whereby the seats of road-carts are supported from the axle, and also to the method of their attachment to the axle. I am aware that various kinds of torsion-springs have been used for this purpose; and my invention, which so far as it concerns the spring itself is an improvement in that description of springs consists in a torsion-spring having a straight portion placed lengthwise of the axle and rigidly clipped thereto, and an arm portion extending at right angles to the axle and connected to the seat or the foot-rest, so as to act as the torsion-producing lever of the spring, such arm portion having formed in it one or more coils whereby to lessen the amount of torsional action exerted upon the straight portion. This and other features of my invention will be fully understood from the annexed drawings, forming a part hereof, and in which—

Figure 1 is a perspective of a road-cart embodying my invention. Fig. 2 is a cross-section of the axle, showing one of the supports for the spring. Fig. 3 shows the spring detached, and Fig. 4 shows a part of one of the clips.

In said drawings, A represents the seat, and B B the curved arms supporting the same, and also supporting the slats C, forming the footrest. Said arms are joined to the cross-bar D of the shafts E' by the spring $b$.

E is the axle, to which the shafts E' are joined by a pivotal joint, $e$.

F F' are the torsional springs affording support to the seat from the axle. Each consists of a straight member or portion, $f$, lying lengthwise of the axle, and a lever portion, $f'$, projecting at right angles to the axle and connected to one of the arms B. One end of the part $f$ is also bent at right angles, as at $f^2$, and is clipped to the axle rigidly, and resists the torsional strain imparted to the part $f$ by the lever part $f'$. A single clip is employed for thus securing the points $f^2$ of the two springs, and it is formed of the strap-bolt G and holder G', the latter having a central sunken recess, $g$, to receive the two points $f^2$ and also flat surfaces $g'$, which bear against the under surface of the axle when the nuts upon the ends of the strap G are tightened. The other end of the straight part of the spring is supported by a holder, H, also held to the axle by a strap-bolt, $h$.

The lever of the spring embodies one or more coils, J, whereby some elasticity is afforded to that portion, and the amount of torsional movement communicated to the straight portion is reduced. The connection between the lever and the seat-bars is formed by the shackles $i$ and is such as to permit all necessary freedom to the parts.

I claim—

1. The combination, with the axle and seat of a road-cart, of the springs F, having straight portions $f$ rigidly clipped to the axle, and lever portions $f'$, embodying a coil and joined to the seat-bars, substantially as set forth.

2. The combination, with the axle and seat, of the springs F, having their points $f^2$ secured to the axle by a single clip composed of a holder having a sunken recess, $g$, and a strap-bolt, substantially as set forth.

3. In a road-cart, the combination of the seat, the seat-bars, springs F, the shafts pivotally joined to the axle, and the spring $b$, uniting the seat-bars and thills, substantially as set forth.

JOSHUA G. GAY.

Witnesses:
J. C. BRIEL,
JOHN C. McKEON.